US009480073B2

(12) United States Patent
Jeon et al.

(10) Patent No.: US 9,480,073 B2
(45) Date of Patent: Oct. 25, 2016

(54) METHOD FOR IMPROVING SHORT-TERM FAIRNESS AND EFFICIENCY IN WIRELESS LOCAL AREA NETWORKS (71) Applicant: Intel IP Corporation, Santa Clara, CA (US)

(72) Inventors: Jeongho Jeon, San Jose, CA (US); Hujun Yin, Saratoga, CA (US); Huaning Niu, Milpitas, CA (US)

(73) Assignee: Intel IP Corporation, Santa Clara, CA (US)

( * ) Notice: Subject to any disclaimer, the term of this patent is extended or adjusted under 35 U.S.C. 154(b) by 110 days.

(21) Appl. No.: 14/469,246

(22) Filed: Aug. 26, 2014

(65) Prior Publication Data
US 2016/0065330 A1   Mar. 3, 2016

(51) Int. Cl.
*H04W 4/00*   (2009.01)
*H04W 72/08*   (2009.01)
*H04W 74/08*   (2009.01)
*H04W 76/02*   (2009.01)
*H04W 84/12*   (2009.01)

(52) U.S. Cl.
CPC ......... *H04W 72/085* (2013.01); *H04W 74/085* (2013.01); *H04W 76/023* (2013.01); *H04W 84/12* (2013.01)

(58) Field of Classification Search
CPC ..................................................... H04W 84/12
USPC ......................................................... 370/338
See application file for complete search history.

(56) References Cited

U.S. PATENT DOCUMENTS

| 6,965,942 | B1* | 11/2005 | Young | H04W 74/085 370/447 |
| 7,787,487 | B2 | 8/2010 | Liu | |
| 2005/0100040 | A1 | 5/2005 | Guo et al. | |
| 2007/0206547 | A1 | 9/2007 | Gong et al. | |
| 2009/0247206 | A1* | 10/2009 | Yacono | H04W 24/02 455/515 |
| 2010/0150074 | A1 | 6/2010 | Yamada et al. | |
| 2011/0019721 | A1 | 1/2011 | Diener et al. | |
| 2015/0242246 | A1* | 8/2015 | Gschwind | G06F 9/522 714/47.2 |

FOREIGN PATENT DOCUMENTS

| WO | WO-2005062538 A1 | 7/2005 |
| WO | WO-2016032603 A1 | 3/2016 |

OTHER PUBLICATIONS

"International Application Serial No. PCT/US2015/036732, International Search Report mailed Sep. 25, 2015", 3 pgs.

(Continued)

*Primary Examiner* — Samina Choudhry
(74) *Attorney, Agent, or Firm* — Schwegman Lundberg & Woessner, P.A.

(57) ABSTRACT

A wireless communication device comprises a transceiver to communicate directly with one or more separate wireless devices in accordance with a WiFi communication protocol, and a controller. The controller is configured to initiate transmission of information using the transceiver upon expiration of a first contention window (CW) count value, detect whether the transmission is successful, change the CW count value to a second CW count value when the transmission is unsuccessful, and change the CW count value from the first CW count value to a third CW count value when the transmission is successful, wherein the third CW count value is a maximum value of one of the first CW count value divided by a specified binary number or a specified minimum CW count value.

20 Claims, 5 Drawing Sheets (56) References Cited

OTHER PUBLICATIONS

"International Application Serial No. PCT/US2015/036732, Written Opinion mailed Sep. 25, 2015", 3 pgs.

Bharghavan, V., et al., "MACAW: A Media Access Protocol for Wireless LAN's", Proceedings of the Conference on Communications Architectures, and Protocals and Applications (SIGCOMM '94), (1994), 212-225.

Chen, Yunli, et al., "Effect of Contention Window on the Performance of IEEE 802.11 WLANs", The Third Annual Mediterranean Ad Hoc Networking Workshop, (Jun. 2004), 441-448.

* cited by examiner

METHOD FOR IMPROVING SHORT-TERM FAIRNESS AND EFFICIENCY IN WIRELESS LOCAL AREA NETWORKS

TECHNICAL FIELD

Embodiments pertain to wireless communication networks. Some embodiments relate to local area networks that communicate according to a wireless local area network (WLAN) protocol.

BACKGROUND

Electronic devices are often interconnected by wireless means to form a network, such as a computer network for example. The devices of the wireless network communicate information using radio frequency (RF) signals, such as by spread spectrum or frequency multiplexing techniques. A wireless local area network (WLAN) is one type of network and a WiFi network is a WLAN implemented under one of the Institute of Electrical and Electronic Engineers 802.11 standards, such as the IEEE 802.11-2012 standard published Mar. 29, 2012. Network protocols continue to evolve to enable more types of devices communicate. A challenge is to provide direct device-to-device communications while avoiding collisions on the communication medium. Thus, there are general needs for devices, systems and methods that provide a protocol for electronic devices to communicate yet results in energy efficient operation of the devices.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
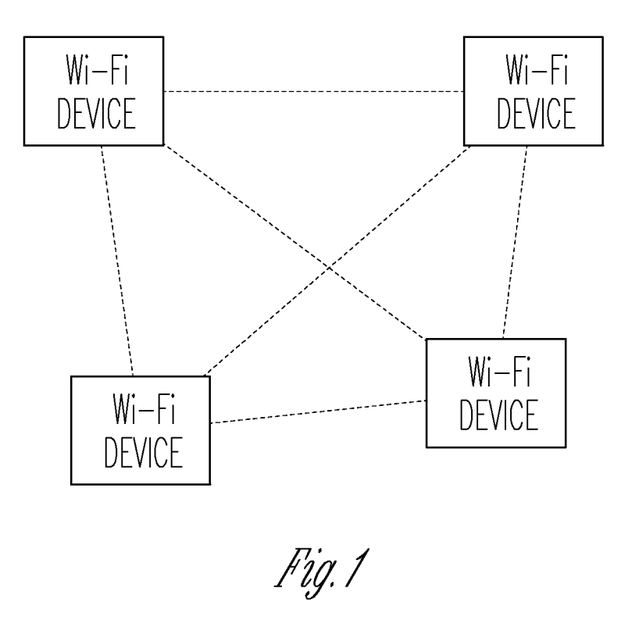
FIG. 1 illustrates a representation of a cluster of WiFi devices in accordance with some embodiments.

FIG. 1 illustrates a representation of a cluster of WiFi devices that may form a WLAN. WLANs are a popular means to facilitate communication among electronic devices. The operation of the network is distributed and coordinated among the wireless communication devices that make up the nodes of the network. Some examples of these devices include communication stations and portable electronic devices such as cellular telephones, smart phones, and portable computers such as laptop or tablet computers.

Some WLANs provide carrier sensing and collision avoidance to coordinate operation of the network. To transmit information, a device may sense the communication medium and determine that the medium is idle before transmitting. If the device determines that the medium is busy, then the device waits until the medium is idle and to begin timing a duration using a back-off counter before attempting to transmit. The time duration can be determined by the value of a countdown window or CW. When a device senses that the medium is idle, the back-off counter may count down starting with the CW until the count reaches zero. Alternatively, the back-off counter may start from zero and count up until the CW is reached. When the back-off counter finishes counting the device attempts to transmit a message. The transmission may be successful or may experience a collision with another transmission.

According to the previously mentioned IEEE 802.11 protocol, a device is initially assigned a CW value that is a specified (e.g., programmed) minimum CW value. When a device experiences a collision, the CW is doubled. If the device continues to experience collisions, the CW value continues to be doubled until the CW reaches a specified maximum CW value. The CW remains at the maximum values if the device continues to experience collisions. When the device determines that a transmission was successful, the CW is reset to the specified CW minimum value. The device continues to set the CW to the specified CW minimum value when subsequent transmissions are successful.

This scheme can lead to inefficiencies in operation of the network. The contention scheme can be seen to favor the latest winner of the communication medium. Once contention for access to the medium is won by a particular device, that device is awarded the minimum CW value and thus the minimum waiting time to access the medium. The network may over-service communications of the winning device because devices with lower CW values may be serviced first, which can result in inefficiencies of the network because the winning device dominates transmissions. This may be especially true for a network experiencing a high density of communication traffic where there is a high chance of collisions. Hence, there are opportunities to further promote efficiency in operation of a WLAN by promoting fairness to access to the medium.

Figure 2:
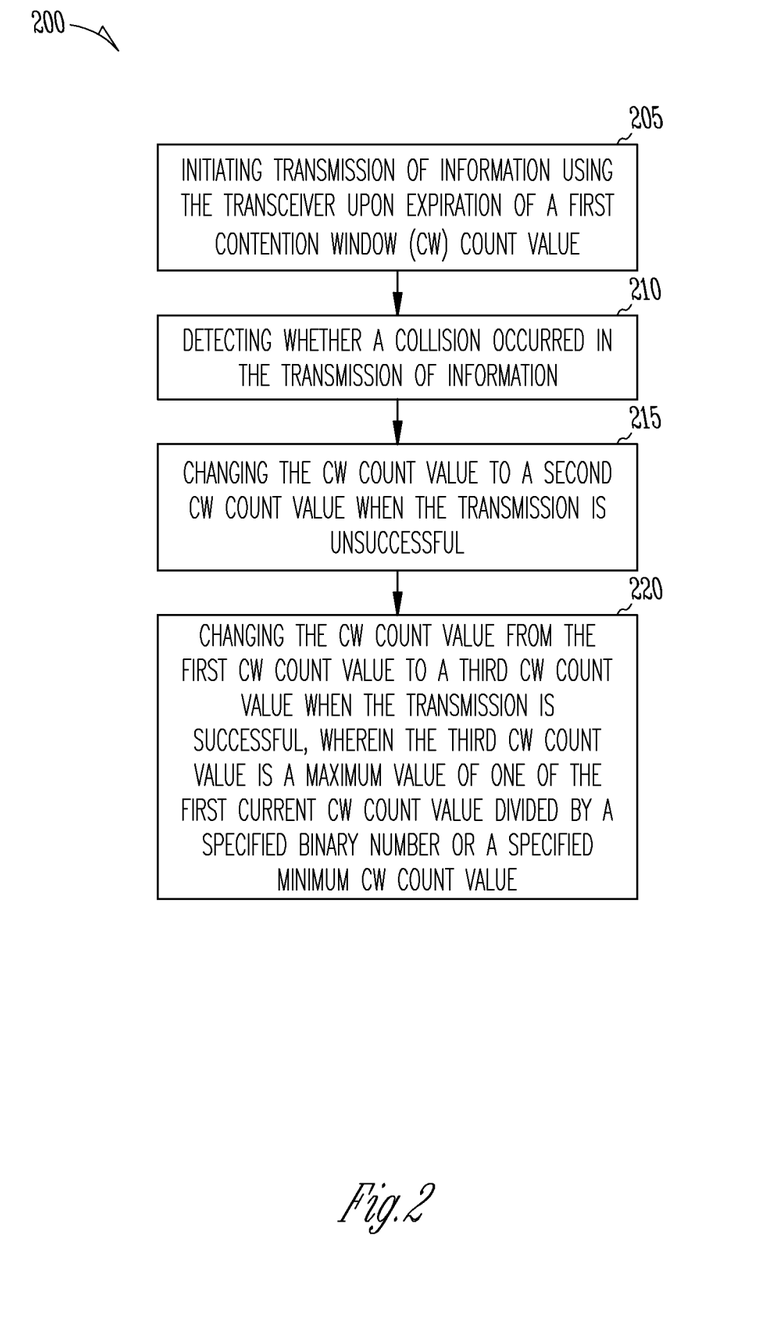
FIG. 2 shows a block diagram of an example of a method of operating a WiFi device in accordance with some embodiments.

FIG. 2 shows a block diagram of an example of a method 200 of operating a WLAN or WiFi device to promote fairness in medium access. At 205, transmission of information using the transceiver is initiated upon expiration of a first CW count value, such as by a back-off counter counting up to the value or counting down from the CW value to zero.

At 210, whether a collision occurred in the transmission is detected. A collision occurs when two or more devices try to communicate using the medium at the same time and the communications are unsuccessful. The unsuccessful transmission can be detected by the transmitting device when an expected acknowledge (ACK) message or an expected clear-to-send (CTS) message is not received by the transmitting device, or not detected within a specified period of time (e.g., a programmed timeout duration).

At 215, the CW count value is changed to a second CW count value when the transmission is unsuccessful. According to some examples, the second CW count value is a minimum value of one of the first CW count value times two or a specified maximum CW count value, or $\min[CW*2, CW_{MAX}]$ where "min" indicates the minimum value function.

At 220, the CW count value is changed from the first CW count value to a third CW count value when the transmission is successful. The third CW count value is a maximum value of one of the first current CW count value divided by a specified binary number or a specified minimum CW count value. In some examples, the binary number is expressed as 2 to the $K^{th}$ power ($2^K$), K being a control variable, e.g., $\max[CW/2^K, CW_{MIN}]$ where "max" indicates the maximum value function. In some examples, K is a variable positive integer received from a separate WLAN or WiFi device.

Figure 3:
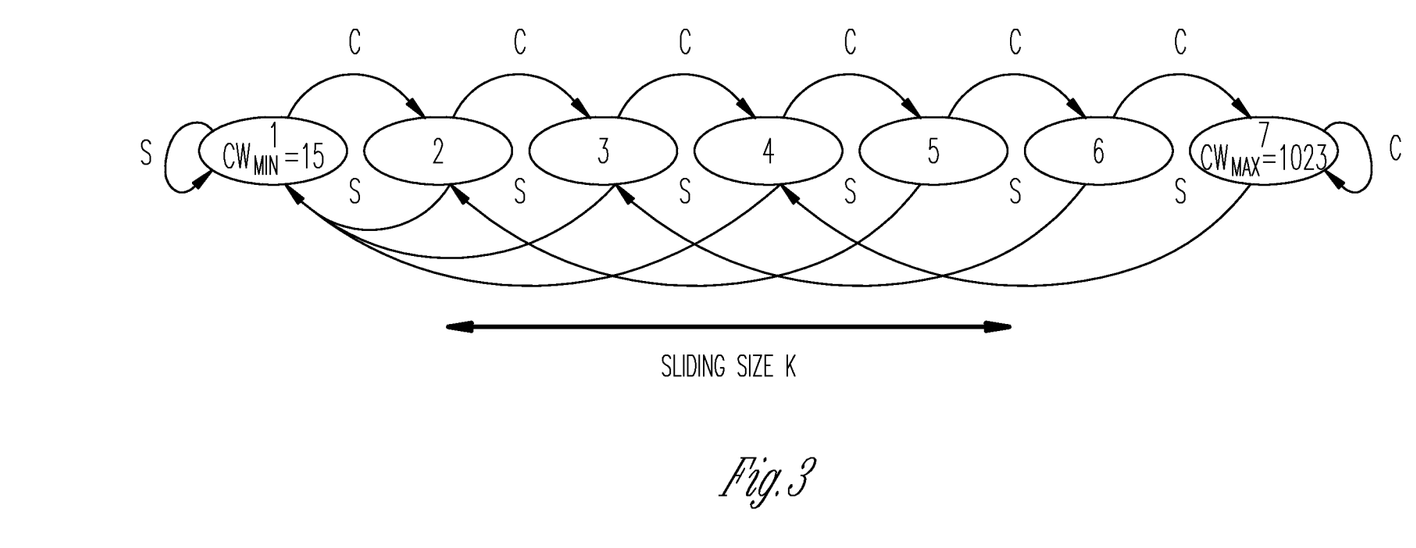
FIG. 3 illustrates an example of a state diagram of operation of a WiFi device in accordance with some embodiments.

FIG. 3 shows an example of a state diagram 300 of the method example shown in FIG. 2. The diagram shows seven states of the WLAN device where a device state is determined by the value of the CW of the device. In state 1 at the left of the diagram, the value of the CW is $CW_{MIN}$, and in state 7 at the right of the diagram, the value of the CW is $CW_{MAX}$. The state paths labeled "C" indicate a transition due to a collision and the state paths labeled "S" indicate a transition due to a successful communication.

The WLAN device moves up one state step (e.g., it doubles the value of the CW) when a transmission is unsuccessful or collides. In the example, the value of the CW in state 1 is 15, the value of the CW in state 2 is 31, and so on up to a CW value of 1023 in state 7. If the device continues to experience collisions it eventually reaches state 7 after experiencing six consecutive unsuccessful transmissions.

In the example shown, the value of the control variable K is 3. The WLAN device moves down K state steps when a transmission is successful (e.g., it divides the value of the CW by $2^K$, or 8). For instance, if the WLAN device was in state 7 with a CW value of 1023, it moves to state 4 with a CW value of 127 when a transmission is successful. If K=2, the WLAN device would move down two steps from state 7 to state 5 with a CW value of 255 when a transmission is successful, and if K=4, the WLAN device would move down four steps to state 3 with a CW value of 64.

Figure 4:
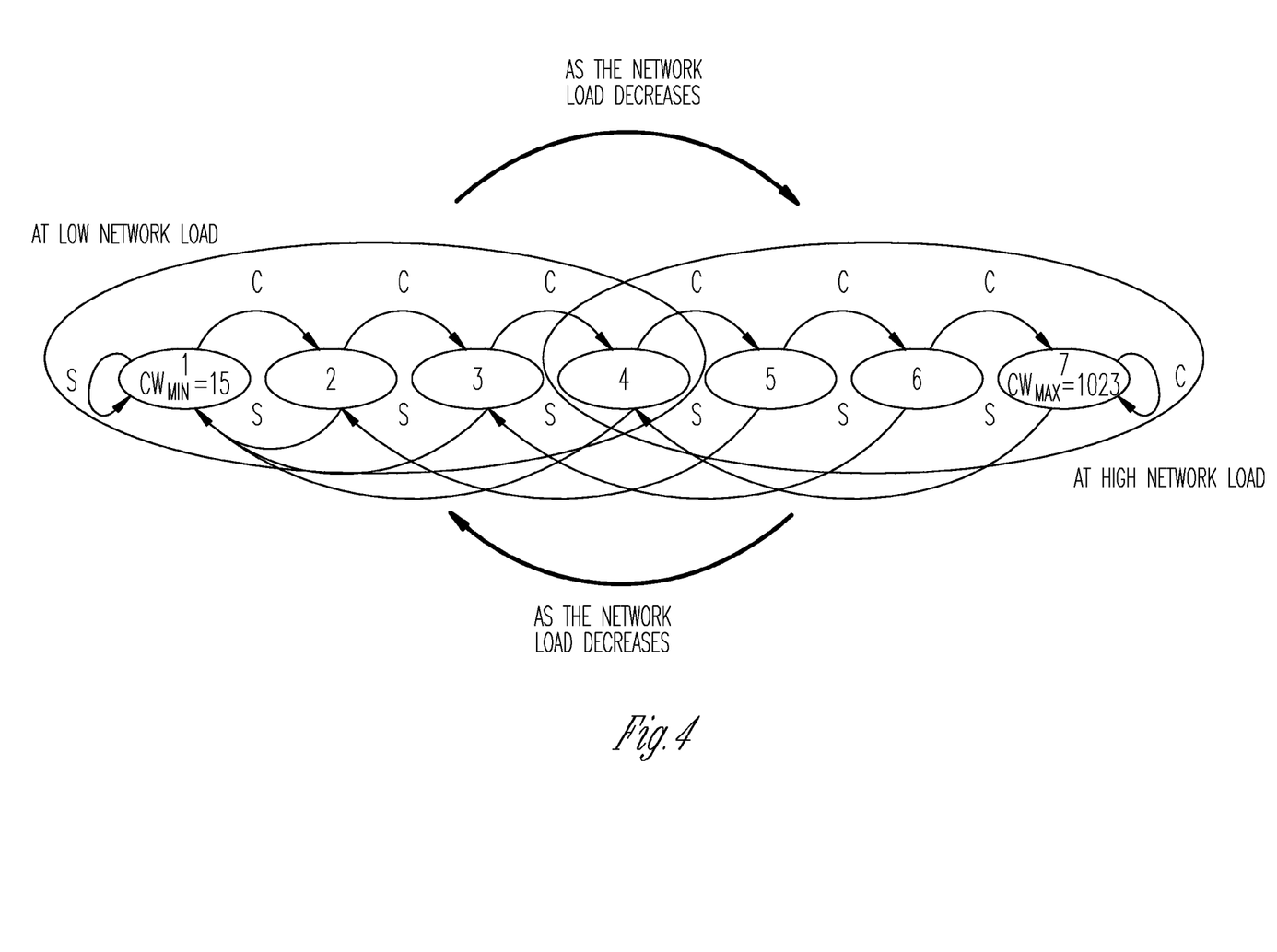
FIG. 4 shows another example of a state diagram of operation of a WiFi device in accordance with some embodiments.

At low network load most of the WLAN devices in the network will maintain smaller CW values and have lower device states. At high network load will maintain larger CW values and reside in the higher device states. This network behavior is illustrated in FIG. 4 for the example of K=3. In the case of transmission success, the progress of a device to the minimum wait time is gradual and allows other transmission traffic to be serviced.

Figure 5:
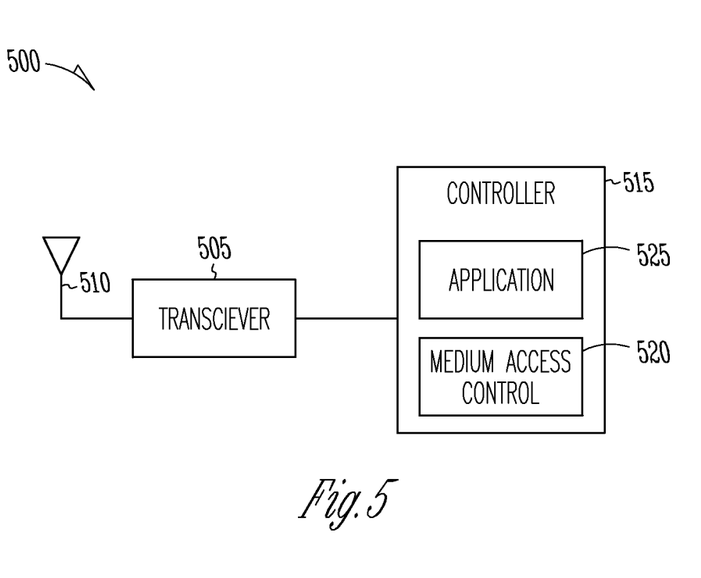
FIG. 5 shows a block diagram of portions of an example of a wireless communication device in accordance with some embodiments.

FIG. 5 shows a block diagram of portions of an example of a wireless communication device 500. The device may be a portable electronic device such as a cellular telephone, smart phone, portable computer such as a laptop or a tablet computer, or the device may be a WiFi communication station.

The wireless communication device includes a transceiver 505 that communicates information with one or more separate wireless communication devices in accordance with a WiFi communication protocol. In certain examples, the transceiver 505 communicates in accordance with a WLAN communication protocol. The transceiver 505 may be part of a physical layer or PHY layer of the communication device 500. The PHY 402 may include circuitry for modulation/demodulation, upconversion/downconversion, filtering, amplification, etc. The transceiver 505 can be electrically coupled to one or more antennas 510. The antennas may comprise one or more directional or omnidirectional antennas, including, for example, dipole antennas, monopole antennas, patch antennas, loop antennas, microstrip antennas or other types of antennas suitable for transmission of RF signals. In some embodiments, instead of two or more antennas, a single antenna with multiple apertures may be used. In these embodiments, each aperture may be considered a separate antenna.

The device also includes a controller 515. The controller 515 can include modules and sub-modules to perform the functions described. A module can include hardware, firmware, or software or combinations of hardware, firmware, and software. The controller 515 can include a processor such as a microprocessor or other type of processor to perform software or firmware instructions. The controller 515 can be configured by one or more of hardware, firmware, and software to perform the functions described. The controller 515 can include a medium access control layer 520 or MAC layer for controlling access to the transceiver 505, and for formatting information for transmission and extracting received information.

The controller 515 may include an Application 525 executing at the controller. Some examples of the Application 525 include multimedia encoding and decoding applications, memory management applications, and graphics processing applications. The Application may request that information is transmitted using the transceiver 505. The controller 515 monitors the communication medium to detect when the medium is idle and initiates transmission of the information upon expiration of a first CW count value. The controller 515 detects whether the transmission is successful. The controller 515 may detect that the transmission is successful when an acknowledge message (ACK) or a clear-to-send message (CTS) is received in response to the transmission.

When the controller 515 detects that the transmission was not successful (e.g., because an ACK or CTS was not detected by the expiration of a specified timeout period), the controller 515 changes the current CW count value to a second CW count value. In some examples, the second CW count value is determined as the minimum value of one of the first CW count value times two or a specified maximum CW count value.

When the transmission is successful, the controller 515 changes the CW count value from the first CW count value to a third CW count value. In some examples, the third CW count value is the maximum value of one of the current CW count value divided by a specified binary number or a specified minimum CW count value. The binary number may be programmed into the wireless communication device or the transceiver may receive the binary number from an access point device of a WLAN or WiFi network.

In some examples, the controller 515 determines the value of the specified binary number as 2 to the $K^{th}$ power ($2^K$), and the CW value is set to $\max[CW/2^K, CW_{MIN}]$. In some examples, the transceiver 505 receives the value of K as a control variable from the access point device. In some examples, the transceiver 505 receives values of the specified maximum CW count value and the specified minimum CW count value from the access point device. According to some examples, the controller 515 may transmit one or more of the values of K, the specified maximum CW count value, and the specified minimum CW count value to a separate second wireless communication device. The controller 515 may perform this function if the WiFi device is an access point for the WLAN or WiFi network.

The several example described promote fairness of access to network resources and consequently can improve network efficiency. Network access is more equitable among the network devices because device contention windows are assigned according to an improved algorithm. These conditions relate to aspects of the communication protocol used by the WLAN devices such as the WiFi protocol for example. Thus, the example devices, systems, and methods provide a communication protocol that promotes efficiency in operation of a wireless device network.

Additional Notes and Examples

Example 1 can include subject matter (such as a wireless communication device) comprising a transceiver configured to communicate directly with one or more separate wireless devices in accordance with a WiFi communication protocol; and a controller configured to: initiate transmission of information using the transceiver upon expiration of a first contention window (CW) count value; detect whether the transmission is successful; and change the CW count value from the first CW count value to a third CW count value when the transmission is successful, wherein the third CW count value is a maximum value of one of the first CW count value divided by a specified binary number or a specified minimum CW count value.

In Example 2, the subject matter of Example 1 can optionally include a transceiver configured to receive a control variable K from an access point device, wherein K is a positive integer, wherein the controller is configured to determine the value of the specified binary number is 2 to the $K^{th}$ power ($2^K$).

In Example 3, the subject matter of Example 2 can optionally include a controller configured to determine the second CW count value as a minimum value of one of the first CW count value times two or a specified maximum CW count value, and wherein the transceiver is configured to receive values of the specified maximum CW count value and the specified minimum CW count value from the access point device.

In Example 4, the subject matter of one or any combination of Examples 2 and 3 can optionally include a transceiver is configured to receive the value of the specified binary number from an access point device.

In Example 5, the subject matter of one or any combination of Examples 1-4 can optionally include the value of the specified binary number is 2 to the $K^{th}$ power ($2^K$), wherein K is a specified positive integer, and a controller configured to initiate transmission of the specified minimum CW count value and the value of K to a separate second wireless communication device.

In Example 6, the subject matter of one or any combination of Examples 1-5 can optionally include a transceiver configured to communicate with one or more separate wireless communication devices in accordance with a wireless local area network (WLAN) communication protocol.

In Example 7, the subject matter of one or any combination of Examples 1-6 can include a wireless communication device that is a smart phone.

In Example 8, the subject matter of one or any combination of Examples 1-6 can include a wireless communication device that is a WiFi communication station.

In Example 9, the subject matter of one or any combination of Examples 1-8 can include a controller configured to detect when the transmission is unsuccessful when a corresponding response for the transmission is undetected by the wireless communication system.

In Example 10, the subject matter of one or any combination of Examples 1-9 can include a controller configured to detect when the transmission is unsuccessful when a clear-to-send message corresponding to the transmission is undetected by the wireless communication system.

Example 11 can include subject matter, or can optionally be combined with the subject matter of one or any combination of Examples 1-10 to include such subject matter, such as a computer readable storage medium including instructions that when performed by hardware processing circuitry of a wireless communication device cause the wireless communication device to: initiate transmission of information using the transceiver upon expiration of a first contention window (CW) count value; detect whether the transmission is successful; change the CW count value to a second CW count value when the transmission is unsuccessful; and change the CW count value from the first CW count value to a third CW count value when the transmission is successful, wherein the third CW count value is a maximum value of one of the first CW count value divided by a specified binary number or a specified minimum CW count value.

In Example 12, the subject matter of Example 11 can optionally include instructions to cause the wireless communication device to determine the value of the specified binary number as 2 to the $K^{th}$ power ($2^K$), wherein K is a variable positive integer received from a separate device.

In Example 13, the subject matter of one or any combination of Examples 11-12 can optionally include instructions to cause the wireless communication device to determine the second count value as a minimum value of one of the first CW count value times two or a specified maximum CW count value, and wherein the controller is configured to receive values of the specified maximum CW count value and the specified minimum CW count value from the access point device.

Example 14 can include subject matter (such as a wireless communication system), or can optionally be combined with the subject matter of one or any combination of Examples 1-13 to include such subject matter, comprising a transceiver configured to communicate information with one or more separate devices in accordance with a WiFi communication protocol; one or more antennas electrically coupled to the transceiver; and a controller configured to: initiate transmission of information using the transceiver upon expiration of a first CW count value; detect whether a collision occurred in the transmission of information; change the CW count value to a second CW count value when a collision is detected; and change the CW count value from the first CW count value to a third CW count value when the transmission is successful, wherein the third CW count value is a maximum value of one of the first current CW count value divided by a specified binary number or a specified minimum CW count value.

In Example 15, the subject matter of Example 14 can optionally include a controller configured to receive a control variable K from an access point of a WiFi network, wherein K is a positive integer and the value of the specified binary number is 2 to the $K^{th}$ power ($2^K$).

In Example 16, the subject matter of one or any combination of Examples 14-15 can optionally include a controller configured to determine the second count value as a minimum value of one of the first CW count value times two or a specified maximum CW count value, and wherein the controller is configured to receive values of the specified maximum CW count value and the specified minimum CW count value from the access point of the WiFi network.

In Example 17, the subject matter of one or any combination of Examples 14-16 can optionally include the value of the specified binary number is 2 to the $K^{th}$ power ($2^K$), wherein K is a specified positive integer, and a controller configured to initiate transmission of the specified minimum CW count value and the value of K to a separate second wireless communication device.

Example 18, can include subject matter (such as a method, a means for performing acts, or a machine-readable medium including instructions that, when performed by the machine, cause the machine to perform acts), or can optionally be combined with the subject matter of one or any combination of Examples 1-17 to include such subject matter, comprising initiating transmission of information using the transceiver upon expiration of a first CW count value; detecting whether a collision occurred in the transmission of information; changing the CW count value to a second CW count value when the transmission is unsuccessful; and changing the CW count value from the first CW count value to a third CW count value when the transmission is successful, wherein the third CW count value is a maximum value of one of the first current CW count value divided by a specified binary number or a specified minimum CW count value.

In Example 19, the subject matter of Example 18 can optionally include determining the value of the specified binary number as 2 to the $K^{th}$ power ($2^K$), wherein K is a variable positive integer received from a separate WLAN device.

In Example 20, the subject matter of one or any combination of Examples 18 and 19 can optionally include determining the second count value as a minimum value of one of the first CW count value times two or a specified maximum CW count value, and wherein the controller is configured to receive values of the specified maximum CW count value and the specified minimum CW count value from the access point device.

In Example 21, the subject matter of one or any combination of Examples 18-20 can optionally include receiving the value of the specified binary number from an access point device.

In Example 22, the subject matter of one or any combination of Examples 18-21 can optionally include detecting when the transmission is unsuccessful when a corresponding response for the transmission is undetected by the wireless communication system.

In Example 23, the subject matter of one or any combination of Examples 18-22 can optionally include detecting when the transmission is unsuccessful when a clear-to-send message corresponding to the transmission is undetected by the wireless communication system.

In Example 24, the subject matter of one or any combination of Examples 18-23 can optionally include detecting when the transmission is unsuccessful when an acknowledge message corresponding to the transmission is undetected by the wireless communication system.

In Example 25, the subject matter of one or any combination of Examples 18-24 can optionally include determining the value of the specified binary number as 2 to the $K^{th}$ power ($2^K$), wherein K is a variable positive integer received from a separate WLAN device, and transmitting the specified minimum CW count value and the value of K to a separate second wireless communication device.

These non-limiting examples can be combined in any permutation or combination.

The above detailed description includes references to the accompanying drawings, which form a part of the detailed description. The drawings show, by way of illustration, specific embodiments in which the invention can be practiced. These embodiments are also referred to herein as "examples." All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

Method examples described herein can be machine or computer-implemented at least in part. Some examples can include a computer-readable storage medium or machine-readable storage medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. The code can be tangibly stored on one or more volatile, non-transitory, or non-volatile tangible computer-readable media, such as during execution or at other times. Examples of these tangible computer-readable storage media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment. Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

What is claimed is:

1. A wireless communication device comprising:
   a transceiver configured to communicate directly with one or more separate wireless devices in accordance with a wireless network communication protocol; and
   a controller electrically coupled to the transceiver and configured to:
      initiate transmission of information using the transceiver upon expiration of a first contention window (CW) count value;
      detect whether the transmission is successful;
      change the CW count value to a second CW count value when the transmission is unsuccessful; and
      change the CW count value from the first CW count value to a third CW count value when the transmission is successful, wherein the third CW count value is a maximum value of (a) the first CW count value divided by a specified binary number and (b) a specified minimum CW count value.

2. The wireless communication device of claim 1, wherein the transceiver is configured to receive a control variable K from an access point device, wherein K is a positive integer, wherein the controller is configured to determine the value of the specified binary number as 2 to the $K^{th}$ power ($2^K$).

3. The wireless communication device of claim 2, wherein the controller is configured to determine the second CW count value as a minimum value of one of the first CW count value times two or a specified maximum CW count value, and wherein the transceiver is configured to receive values of the specified maximum CW count value and the specified minimum CW count value from the access point device.

4. The wireless communication device of claim 1, wherein the transceiver is configured to receive the value of the specified binary number from an access point device.

5. The wireless communication device of claim 1, wherein the value of the specified binary number is 2 to the $K^{th}$ power ($2^K$), wherein K is a specified positive integer, and wherein the controller is configured to initiate transmission of the specified minimum CW count value and the value of K to a separate second wireless communication device.

6. The wireless communication device of claim 1, wherein the transceiver is configured to communicate with one or more separate wireless communication devices in accordance with a wireless local area network (WLAN) communication protocol.

7. The wireless communication device of claim 1, wherein the wireless communication device is a smart phone.

8. The wireless communication device of claim 1, wherein the wireless communication device is a WiFi communication station.

9. The wireless communication system of claim 1, wherein the controller is configured to detect when the transmission is unsuccessful when a corresponding response for the transmission is undetected by the wireless communication system.

10. The wireless communication system of claim 1, wherein the controller is configured to detect when the transmission is unsuccessful when a clear-to-send message corresponding to the transmission is undetected by the wireless communication system.

11. A non-transitory computer readable medium including instructions that when executed by hardware processing circuitry of a wireless communication device cause the wireless communication device to:
 initiate transmission of information using the transceiver upon expiration of a first contention window (CW) count value;
 detect whether the transmission is successful;
 change the CW count value to a second CW count value when the transmission is unsuccessful; and
 change the CW count value from the first CW count value to a third CW count value when the transmission is successful, wherein the third CW count value is a maximum value of (a) the first CW count value divided by a specified binary number and (b) a specified minimum CW count value.

12. The non-transitory computer readable medium of claim 11, including instructions that when executed by the wireless communication device cause the wireless communication device to determine the value of the specified binary number as 2 to the $K^{th}$ power ($2^K$), wherein K is a variable positive integer received from a separate device.

13. The non-transitory computer readable medium of claim 12, including instructions that when executed by the wireless communication device cause the wireless communication device to determine the second count value as a minimum value of one of the first CW count value times two or a specified maximum CW count value, and wherein the controller is configured to receive values of the specified maximum CW count value and the specified minimum CW count value from the access point device.

14. A wireless communication system comprising:
 a transceiver configured to communicate information with one or more separate devices in accordance with a wireless network communication protocol;
 one or more antennas electrically coupled to the transceiver; and
 a controller configured to:
  initiate transmission of information using the transceiver upon expiration of a first contention window (CW) count value;
  detect whether a collision occurred in the transmission of information;
  change the CW count value to a second CW count value when a collision is detected; and
  change the CW count value from the first CW count value to a third CW count value when the transmission is successful, wherein the third CW count value is a maximum value of (a) the first CW count value divided by a specified binary number and (b) a specified minimum CW count value.

15. The wireless communication system of claim 14, wherein the controller is configured to receive a control variable K from an access point of a WiFi network, wherein K is a positive integer and the value of the specified binary number is 2 to the $K^{th}$ power ($2^K$).

16. The wireless communication system of claim 15, wherein the controller is configured to determine the second count value as a minimum value of one of the first CW count value times two or a specified maximum CW count value, and wherein the controller is configured to receive values of the specified maximum CW count value and the specified minimum CW count value from the access point of the WiFi network.

17. The wireless communication system of claim 14, wherein the value of the specified binary number is 2 to the $K^{th}$ power ($2^K$), wherein K is a specified positive integer, and wherein the controller is configured to initiate transmission of the specified minimum CW count value and the value of K to a separate second wireless communication device.

18. A method of operating a wireless network device, the method comprising:
 initiating transmission of information using the transceiver upon expiration of a first contention window (CW) count value;
 detecting whether a collision occurred in the transmission of information;
 changing the CW count value to a second CW count value when the transmission is unsuccessful; and
 changing the CW count value from the first CW count value to a third CW count value when the transmission is successful, wherein the third CW count value is a maximum value of (a) the first CW count value divided by a specified binary number and (b) a specified minimum CW count value.

19. The method of claim 18, including determining the value of the specified binary number as 2 to the $K^{th}$ power ($2^K$), wherein K is a variable positive integer received from a separate wireless network device.

20. The method of claim 18, including determining the second count value as a minimum value of one of the first CW count value times two or a specified maximum CW count value, and wherein the controller is configured to receive values of the specified maximum CW count value and the specified minimum CW count value from the access point device.

\* \* \* \* \*